US012087488B2

(12) United States Patent
Maki

(10) Patent No.: US 12,087,488 B2

(45) Date of Patent: Sep. 10, 2024

(54) COIL COMPONENT AND ELECTRONIC COMPONENT

(71) Applicant: Murata Manufacturing Co., Ltd., Kyoto-fu (JP)

(72) Inventor: Kenichiro Maki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 779 days.

(21) Appl. No.: 17/330,233

(22) Filed: May 25, 2021

(65) Prior Publication Data

US 2021/0375521 A1 Dec. 2, 2021

(30) Foreign Application Priority Data

May 27, 2020 (JP) ................................ 2020-091921

(51) Int. Cl.

*H01F 27/26* (2006.01)

*H01F 27/28* (2006.01)

(52) U.S. Cl.

CPC ....... *H01F 27/266* (2013.01); *H01F 27/2823* (2013.01)

(58) Field of Classification Search

CPC .......................... H01F 27/266; H01F 27/2823

See application file for complete search history.

(56) References Cited

U.S. PATENT DOCUMENTS

2004/0169567 A1* 9/2004 Okamoto .............. H01F 27/266 333/181

2018/0061557 A1* 3/2018 Yang ........................ H01F 27/38

2020/0203052 A1* 6/2020 Murakami .......... H01F 27/2828

FOREIGN PATENT DOCUMENTS

CN 109564812 A * 4/2019 .......... H01F 17/045

JP S56-012814 U 2/1981

JP S60-039209 U 3/1985

JP H06-267760 A 9/1994

JP H07-106157 A 4/1995

JP 2010003926 A * 1/2010

JP 2011253877 A * 12/2011

JP 2019079974 A * 5/2019

* cited by examiner

*Primary Examiner* — Malcolm Barnes

(74) *Attorney, Agent, or Firm* — Studebaker & Brackett PC

(57) ABSTRACT

A coil component includes a magnetic core that includes a pair of wind portions, a pair of coil conductors where respective conductive wires are wound around the wind portions, and a securing member that has spring properties, includes an upper surface portion, first and second side surface portions, and first and second bottom surface portions, and secures the core while surrounding the core. With the securing member removed from the core, angles formed by the upper surface portion and first side surface portion, the upper surface portion and second side surface portion, the first side surface portion and first bottom surface portion, and the second side surface portion and second bottom surface portion are acute angles. The first and second side surface portions are formed by curved surfaces. The first and second bottom surface portions serve as mounted portions when the coil component is mounted over a mounting board.

20 Claims, 11 Drawing Sheets

COIL COMPONENT AND ELECTRONIC COMPONENT

CROSS-REFERENCE TO RELATED APPLICATION

This application claims benefit of priority to Japanese Patent Application No. 2020-091921, filed May 27, 2020, the entire content of which is incorporated herein by reference.

BACKGROUND

Technical Field

The present disclosure relates to a coil component and an electronic component where the coil component is provided.

Background Art

A coil component having a structure in which a conductive wire is wound around a wind portion of a magnetic core is known. It is also known to secure a magnetic core and a coil conductor where a conductive wire is wound using a securing member having spring properties.

Japanese Unexamined Patent Application Publication No. 7-106157 describes how a combination structure of a transformer core and a bobbin (coil conductor) is secured by a flat spring surrounding the combination structure.

When a coil component is mounted over a mounting board, the coil component is typically mounted using solder or the like so that a conductive wire of a coil conductor is connected to wiring, an electrode, or the like on the mounting board. However, only connecting the conductive wire of the coil conductor may fail to bring sufficient mounting strength, depending on the environment where the coil component is used, for example.

SUMMARY

Accordingly, the present disclosure provides a coil component that can enhance the mounting strength and an electronic component where the coil component is provided.

According to preferred embodiments of the present disclosure, a coil component includes a magnetic core that includes a pair of wind portions; a pair of coil conductors where respective conductive wires are wound around the pair of wind portions; and a securing member that has spring properties, includes an upper surface portion, a first side surface portion and a second side surface portion, and a first bottom surface portion and a second bottom surface portion, and secures the magnetic core while surrounding the magnetic core. In a state where the securing member is removed from the magnetic core, an angle formed by the upper surface portion and the first side surface portion and an angle formed by the upper surface portion and the second side surface portion are each an acute angle, an angle formed by the first side surface portion and the first bottom surface portion and an angle formed by the second side surface portion and the second bottom surface portion are each an acute angle, and the first side surface portion and the second side surface portion are each formed by a curved surface. Also, the first bottom surface portion and the second bottom surface portion serve as mounted portions when the coil component is mounted over a mounting board.

According to preferred embodiments of the present disclosure, a coil component includes a magnetic core that includes a pair of wind portions; a pair of coil conductors where respective conductive wires are wound around the pair of wind portions; and a securing member that has spring properties, includes an upper surface portion, a first side surface portion and a second side surface portion, and a first bottom surface portion and a second bottom surface portion, and secures the magnetic core while surrounding the magnetic core, where one distal end portion of the securing member has a projecting portion that projects toward the other distal end portion while the other distal end portion has a depressed portion, the one distal end portion being one of a first distal end portion of the first bottom surface portion and a second distal end portion of the second bottom surface portion, the projecting portion and the depressed portion are positioned in a straight line in a direction in which the first side surface portion and the side surface portion face each other, and the first bottom surface portion and the second bottom surface portion serve as mounted portions when the coil component is mounted over a mounting board.

In the coil component according to preferred embodiments of the present disclosure, the first bottom surface portion and the second bottom surface portion of the securing member serve as mounted portions when the coil component is mounted over the mounting board, and thus, the joint strength between the coil component and the mounting board can be enhanced.

Other features, elements, characteristics and advantages of the present disclosure will become more apparent from the following detailed description of preferred embodiments of the present disclosure with reference to the attached drawings.

DETAILED DESCRIPTION

Embodiments of the present disclosure are presented below to specifically describe the features of the present disclosure. Herein, the description is predicated on that a coil component according to the present disclosure is a common mode choke coil. However, the coil component is not limited to a common mode choke coil.

First Embodiment

Figure 1:
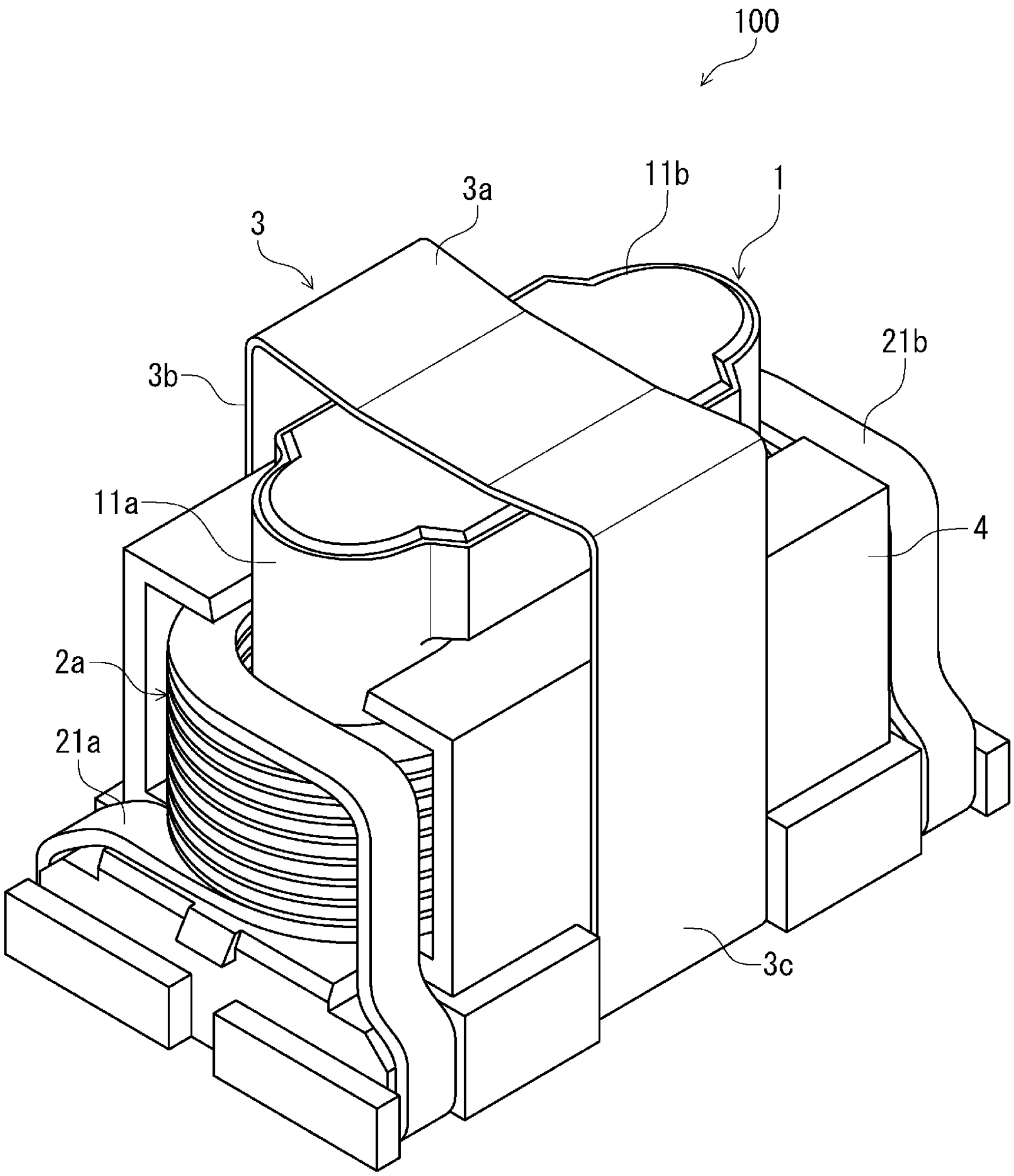
FIG. 1 is a perspective view that schematically illustrates the shape of a coil component according to a first embodiment, which is viewed from diagonally above.
Figure 2:
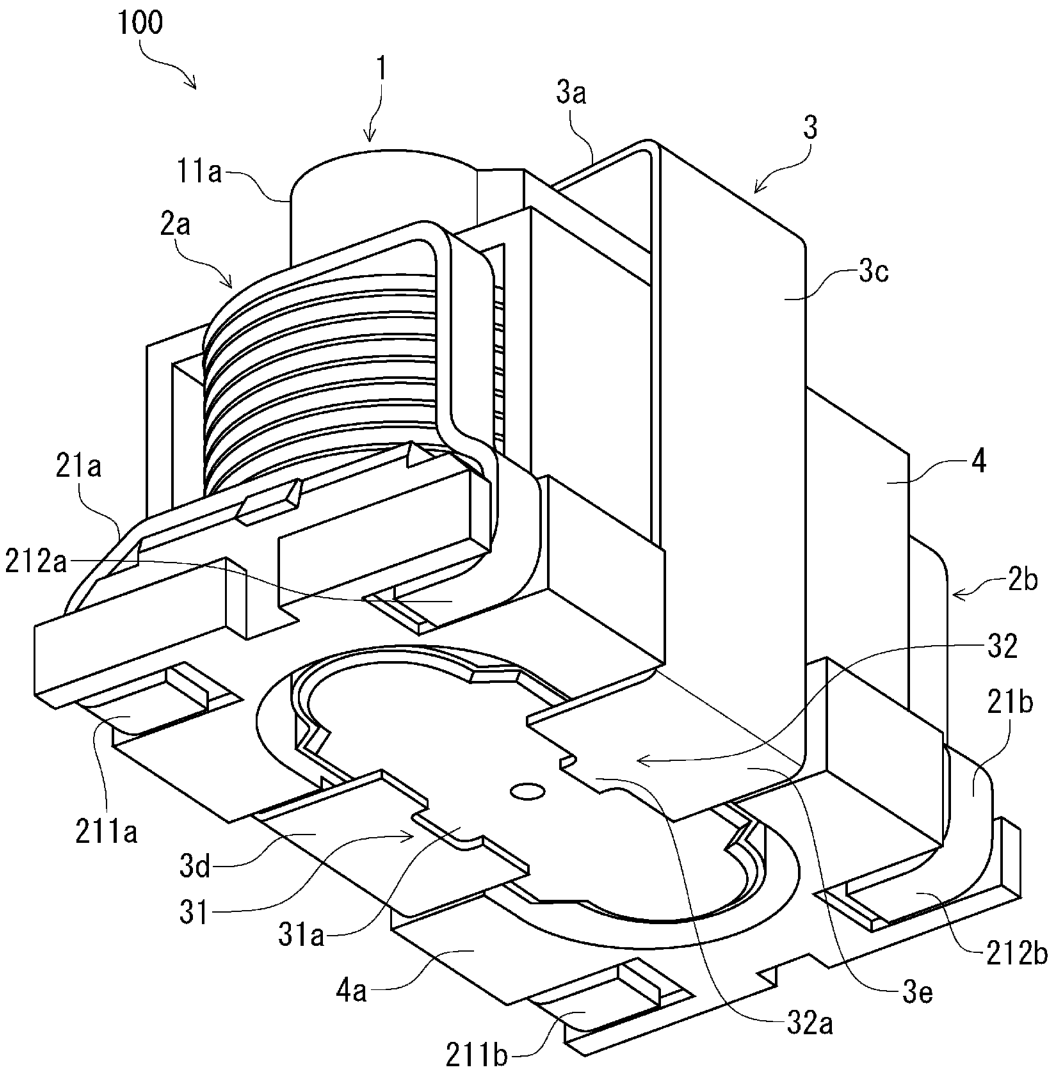
FIG. 2 is a perspective view that schematically illustrates the shape of the coil component according to the first embodiment, which is viewed from diagonally below.
Figure 3:
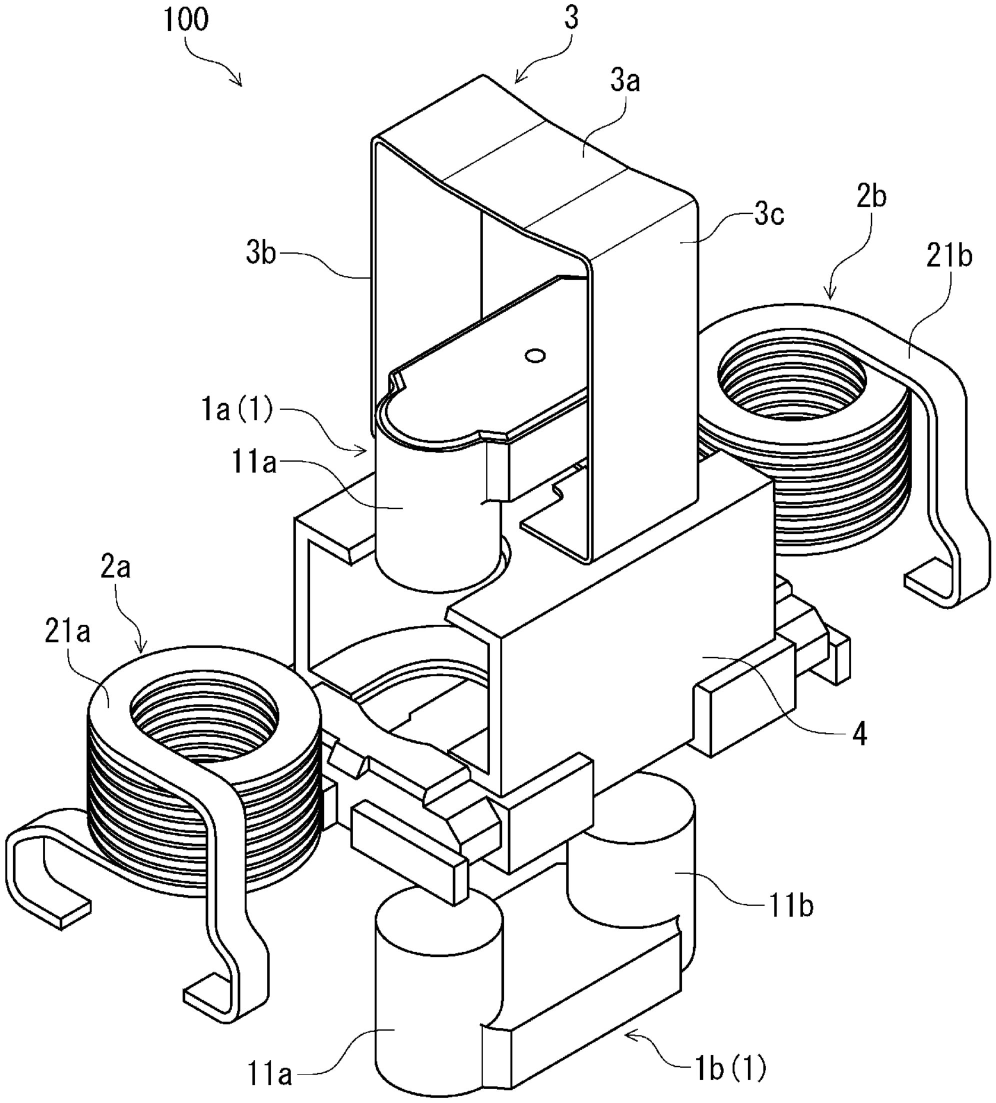
FIG. 3 is an exploded perspective view for describing the structure of the coil component according to the first embodiment.

FIG. 1 is a perspective view that schematically illustrates the shape of a coil component 100 according to a first embodiment, which is viewed from diagonally above. FIG. 2 is a perspective view that schematically illustrates the shape of the coil component 100 according to the first embodiment, which is viewed from diagonally below. FIG. 3 is an exploded perspective view for describing the structure of the coil component 100 according to the first embodiment.

The coil component 100 according to the first embodiment includes a magnetic core 1, a first coil conductor 2*a* and a second coil conductor 2*b*, which constitute a pair of coil conductors, and a securing member 3. The coil component 100 according to the present embodiment further includes a holding member 4.

As illustrated in FIG. 3, the magnetic core 1 is made up of a first magnetic core 1*a* and a second magnetic core 1*b*, which can be separated. That is, the first magnetic core 1 and the second magnetic core 1*b* are coupled to form the magnetic core 1 having a shape of a frame body.

The magnetic core 1 is made from a ferrite material. The ferrite material is not particularly limited and, for example, various ferrite materials can be used, which include Ni based, Cu—Zn based, Ni—Zn based, Mn—Zn based, and Ni—Cu—Zn based ferrite materials.

The magnetic core 1 includes a first wind portion 11*a* and a second wind portion 11*b*, which constitute a pair of wind portions.

The pair of coil conductors 2*a* and 2*b* have structures in which conductive wires 21*a* and 21*b* are wound around the pair of wind portions 11*a* and 11*b* of the magnetic core 1, respectively. Specifically, the first coil conductor 2*a* has a structure in which the first conductive wire 21*a* is wound around the first wind portion 11*a* and the second coil conductor 2*b* has a structure in which the second conductive wire 21*b* is wound around the second wind portion 11*b*. In the state where the coil component 100 is mounted over a mounting board, the axial directions of the winding shafts of the first coil conductor 2*a* and the second coil conductor 2*b* are orthogonal to the mounting board.

In the present embodiment, the first conductive wire 21*a* and the second conductive wire 21*b* are each a covered rectangular wire whose core material is made from a metallic material, such as Cu, Al, or a kind of alloy thereof, and whose core material is covered with an enamel material, such as polyamide-imide. Because of the first conductive wire 21*a* and the second conductive wire 21*b* being covered rectangular wires, the space factor can be increased and the rated current can be raised further in comparison with the case where covered round wires are used, and as a result, a common mode choke coil small in size and high in performance can be obtained. However, the structures of the first conductive wire 21*a* and the second conductive wire 21*b* are not limited to the above-described structures.

In the case of a common mode choke coil, the first coil conductor 2*a* and the second coil conductor 2*b* have shapes that make mirror symmetry. In the present embodiment, the first coil conductor 2*a* and the second coil conductor 2*b* are formed by edgewise winding in which the first conductive wire 21*a* and the second conductive wire 21*b* as flat covered rectangular wires are each bent in a width direction and wound.

As illustrated in FIG. 2, one end and the other end of each of the first conductive wire 21*a* and the second conductive wire 21*b* are folded and engaged with a bottom surface 4*a* of the holding member 4. When the coil component 100 is mounted over the mounting board, portions 211*a* and 212*a* that are included in the first conductive wire 21*a* and positioned on the side of the bottom surface 4*a* of the holding member 4 and portions 211*b* and 212*b* that are included in the second conductive wire 21*b* and positioned on the side of the bottom surface 4*a* of the holding member 4 are connected to wiring, electrodes, or the like on the mounting board using solder for example.

The holding member 4 is made from an insulative material and holds the magnetic core 1, the first coil conductor 2*a*, and the second coil conductor 2*b* while surrounding the magnetic core 1, the first coil conductor 2*a*, and the second coil conductor 2*b*. "While surrounding the magnetic core 1, the first coil conductor 2*a*, and the second coil conductor 2*b*" means that at least respective partial portions of the magnetic core 1, the first coil conductor 2*a*, and the second coil conductor 2*b* are surrounded. When the coil component 100 is mounted over the mounting board, the bottom surface 4*a* of the holding member 4 serves as the surface that faces the mounting board.

Figure 4A:
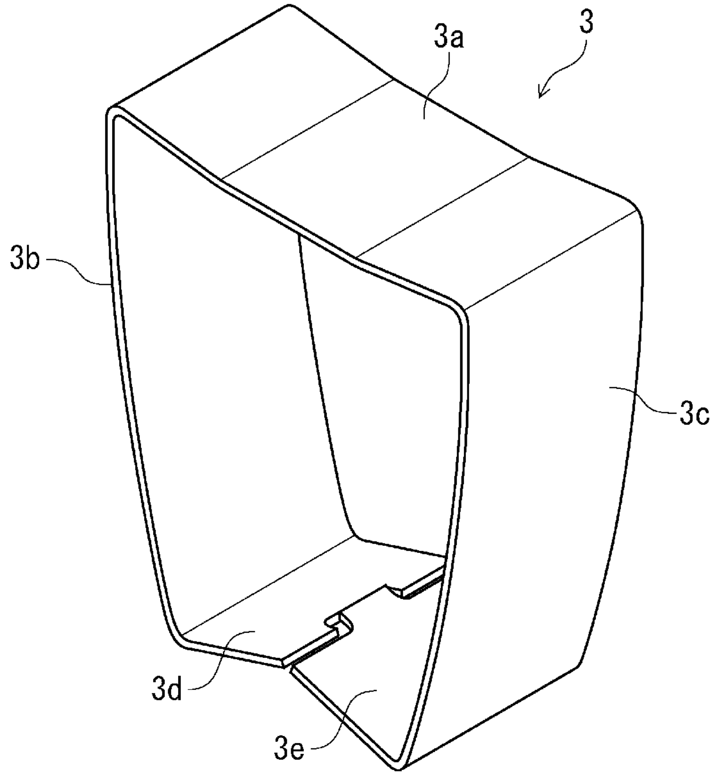
FIG. 4A is a perspective view that schematically illustrates the shape of a securing member of the coil component according to the first embodiment, which is viewed from diagonally above.
Figure 4B:
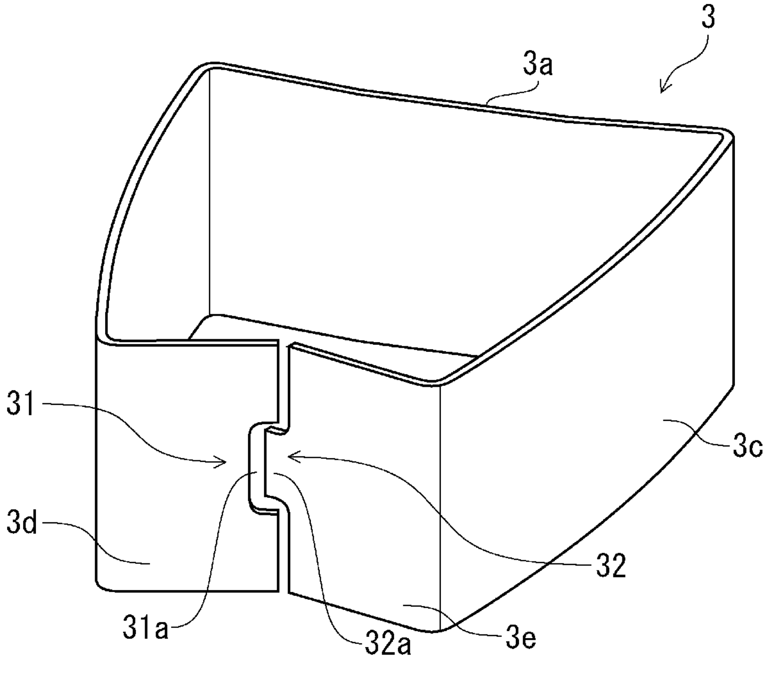
FIG. 4B is a perspective view that schematically illustrates the shape of the securing member, which is viewed from diagonally below.
Figure 5:
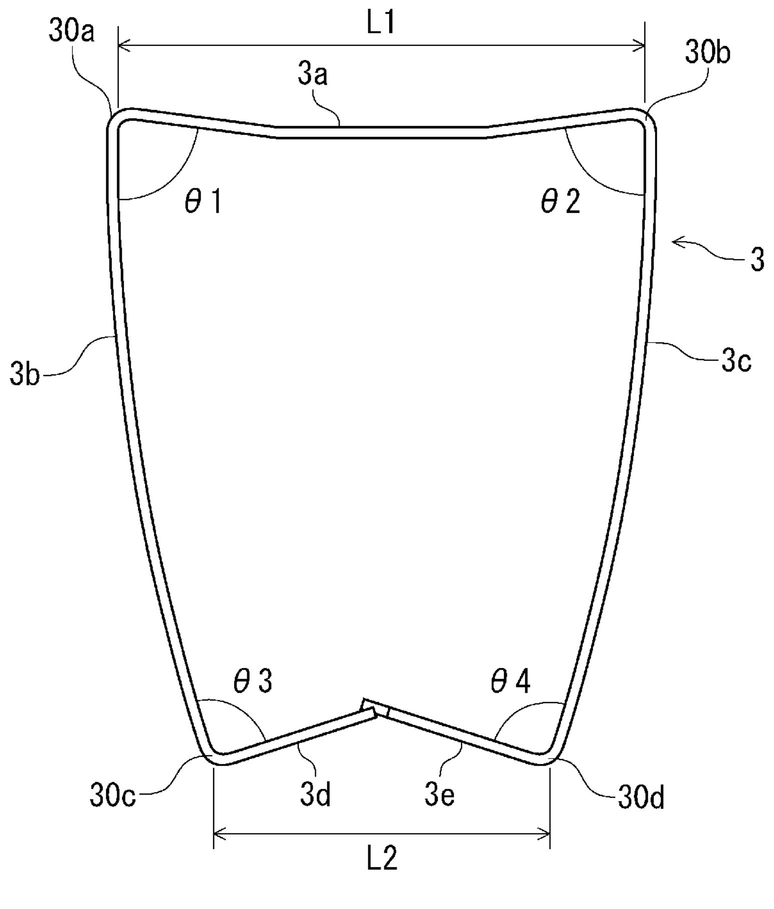
FIG. 5 is a side view that illustrates the securing member in the state where a first side surface portion and a second side surface portion are positioned on the left and right sides to face each other.

FIG. 4A is a perspective view that schematically illustrates the shape of the securing member 3, which is viewed from diagonally above, and FIG. 4B is a perspective view that schematically illustrates the shape of the securing member 3, which is viewed from diagonally below. FIG. 5 is a side view of the securing member 3, and more specifically, is a side view that illustrates the state where a first side surface portion 3*b* and a second side surface portion 3*c*, described later, are positioned on the left and right sides to face each other. FIG. 4 and FIG. 5 each depict the securing member 3 in the state of being removed from the magnetic core 1.

The securing member 3 has spring properties and includes an upper surface portion 3*a*, the first side surface portion 3*b* and the second side surface portion 3*c*, which are connected to the upper surface portion 3*a*, and a first bottom surface portion 3*d*, which is connected to the first side surface portion 3*b*, and a second bottom surface portion 3*e*, which is connected to the second side surface portion 3*c*.

As illustrated in FIG. 1 and FIG. 2, the securing member 3 secures the magnetic core 1 with elastic force while surrounding the magnetic core 1. "While surrounding the magnetic core 1" means that at least a partial portion of the magnetic core 1 is surrounded. In the present embodiment, the securing member 3 secures the magnetic core 1 while surrounding the magnetic core 1 and the holding member 4. More specifically, the securing member 3 sandwiches the magnetic core 1 from both sides in the axial direction of each winding shaft of the pair of coil conductors 2*a* and 2*b* and secures the magnetic core 1. On the other hand, a gap is present between the securing member 3 and the holding member 4 in the direction in which the first side surface portion 3*b* and the second side surface portion 3*c* face each other, and thus, the holding member 4 can move although restricted within a certain range. The presence of the gap can inhibit concentration of stress in part of the coil component 100 even if any of the magnetic core 1, the pair of coil conductors 2*a* and 2*b*, the securing member 3, and the holding member 4 becomes expanded or shrunk by variation in temperature.

The first bottom surface portion 3*d* and the second bottom surface portion 3*e* of the securing member 3 serve as mounted portions when the coil component 100 is mounted over the mounting board. Specifically, the first bottom surface portion 3*d* and the second bottom surface portion 3*e* of the securing member 3 are engaged with the bottom surface 4*a* of the holding member 4 as a mounted surface and exposed to form an identical plane with the portions 211*a*, 211*b*, 212*a*, and 212*b* positioned on the side of the bottom surface 4*a* of the holding member 4. The first bottom surface portion 3*d* and the second bottom surface portion 3*e* of the securing member 3 are connected using solder or the like to wiring, electrodes, or the like on the mounting board when the coil component 100 is mounted over the mounting board.

The securing member 3 is made from metal and is preferably made from, for example, a material having favorable solder wettability, such as nickel silver, which is a Cu—Zn—Ni alloy. If a metallic material low in solder wettability is used as a constituent material of the securing member 3 for example, it is preferable that a plating film be formed on outer side portions of the first bottom surface portion 3*d* and the second bottom surface portion 3*e* that serve as the portions that are mounted over the mounting board. The material used for the plating film is just needed to be a material suitable for the mounting and, for example, Sn, an Sn alloy, or the like can be used.

By the first bottom surface portion 3*d* and the second bottom surface portion 3*e* of the securing member 3 serving as the mounted portions, the securing member 3 can also be joined to the mounting board using solder or the like when the coil component 100 is mounted over the mounting board. Accordingly, the mounting strength at the time of mounting the coil component 100 over the mounting board can be enhanced.

As for a typical coil component, a method is conceivable so as to enhance the mounting strength, in which a dummy electrode is provided on the coil component and the dummy electrode is joined to the mounting board so that the mounting strength of the coil component can be enhanced. In that case, however, the dummy electrode needs to be provided extra. In contrast, in the coil component 100 according to the present embodiment, the mounting strength can be enhanced without providing any dummy electrode.

As illustrated in FIG. 5, in the state where the securing member 3 is removed from the magnetic core 1, an angle θ1 formed by the upper surface portion 3*a* and the first side surface portion 3*b* and an angle θ2 formed by the upper surface portion 3*a* and the second side surface portion 3*c* are each an acute angle. Also, an angle θ3 formed by the first side surface portion 3*b* and the first bottom surface portion 3*d* and an angle θ4 formed by the second side surface portion 3*c* and the second bottom surface portion 3*e* are each an acute angle. Further, the first side surface portion 3*b* and the second side surface portion 3*c* are each formed by a curved surface. Since the above-described angles θ1 to 04 are each an acute angle, the securing member 3 can sandwich the magnetic core 1 from both sides in the axial direction of each winding shaft of the pair of coil conductors 2*a* and 2*b* and secure the magnetic core 1.

As in the present embodiment, when the first side surface portion 3*b* and the second side surface portion 3*c* are each formed by a curved surface and the upper surface portion 3*a* is no plane, the angle formed by a tangent of an end portion of the upper surface portion 3*a* on the side of the first side surface portion 3*b* and a tangent of an end portion of the first side surface portion 3*b* on the side of the upper surface portion 3*a* is referred to as θ1 while the angle formed by a tangent of an end portion of the upper surface portion 3*a* on the side of the second side surface portion 3*c* and a tangent of an end portion of the second side surface portion 3*c* on the side of the upper surface portion 3*a* is referred to as θ2. In addition, the angle formed by a tangent of an end portion of the first surface portion 3*b* on the side of the first bottom surface portion 3*d* and the first bottom surface portion 3*d* is referred to as θ3 while the angle formed by a tangent of an end portion of the second surface portion 3*c* on the side of the second bottom surface portion 3*e* and the second bottom surface portion 3*e* is referred to as θ4.

As illustrated in FIG. 5, a distance L2 between a third connection point 30*c*, which is a connection point of the first side surface portion 3*b* and the first bottom surface portion 3*d*, and a fourth connection point 30*d*, which is a connection point of the second side surface portion 3*c* and the second bottom surface portion 3*e*, is shorter than a distance L1 between a first connection point 30*a*, which is a connection point of the upper surface portion 3*a* and the first side surface portion 3*b*, and a second connection point 30*b*, which is a connection point of the upper surface portion 3*a* and the second side surface portion 3*c*. By the distance L2 being shorter than the distance L1, the movement of the holding member 4 in the direction in which the first side surface portion 3*b* and the second side surface portion 3*c* face each other can be restricted.

In the state where the magnetic core 1 is secured by the securing member 3, as illustrated in FIG. 1 and FIG. 2, the first side surface portion 3*b* and the second side surface portion 3*c* are each approximately shaped like a plane, which is substantially parallel to the direction orthogonal to the bottom surface 4*a* of the holding member 4, depending on the shape of the holding member 4. However, in the state where the magnetic core 1 is secured by the securing member 3, the first side surface portion 3*b* and the second side surface portion 3*c* may be curved. As illustrated in FIG. 2, the first bottom surface portion 3*d* and the second bottom surface portion 3*e* are each substantially in contact with the bottom surface 4*a* of the holding member 4 and substantially parallel to the bottom surface 4*a*.

As illustrated in FIG. 4B, one distal end portion of the securing member 3, which is one of a first distal end portion 31 of the first bottom surface portion 3*d* and a second distal end portion 32 of the second bottom surface portion 3*e*, has a projecting portion that projects toward the other distal end portion while the other distal end portion has a depressed portion. In the state where the securing member 3 is removed from the magnetic core 1, the projecting portion is positioned inside the depressed portion.

In the present embodiment, the second distal end portion 32 of the second bottom surface portion 3*e* has a projecting portion 32*a* while the first distal end portion 31 of the first bottom surface portion 3*d* has a depressed portion 31*a*.

However, the first distal end portion 31 of the first bottom surface portion 3*d* may have the projecting portion while the second distal end portion 32 of the second bottom surface portion 3*e* may have the depressed portion.

As illustrated in FIG. 2, in the state where the securing member 3 is attached, the projecting portion 32*a* and the depressed portion 31*a* are positioned in a substantially straight line in the direction in which the first side surface portion 3*b* and the second side surface portion 3*c* face each other. Such a structure increases the length of the outer edge that forms the first bottom surface portion 3*d* and the second bottom surface portion 3*e* of the securing member 3 and thus, firm connection with the mounted surface is enabled and the connection strength of the coil component 100 can be enhanced.

In the present embodiment, the projecting portion 32*a* is a projection that projects toward the first distal end portion 31 and the depressed portion 31*a* is a depression. In the present embodiment, the depression has a shape dependent on the shape of the projection. That is, in the state where the securing member 3 is removed from the magnetic core 1, as illustrated in FIGS. 4A and 4B, the projection as the projecting portion 32*a* of the second distal end portion 32 is positioned inside the depression as the depressed portion 31*a* of the first distal end portion 31.

However, in the state where the securing member 3 is removed from the magnetic core 1, as illustrated in FIG. 4B, the first bottom surface portion 3*d* and the second bottom surface portion 3*e* are not in contact with each other because of the gap present therebetween. The width of the gap present between the first bottom surface portion 3*d* and the second bottom surface portion 3*e* is shorter than at least a width W1 (see FIG. 6) of the securing member 3.

Figure 6:
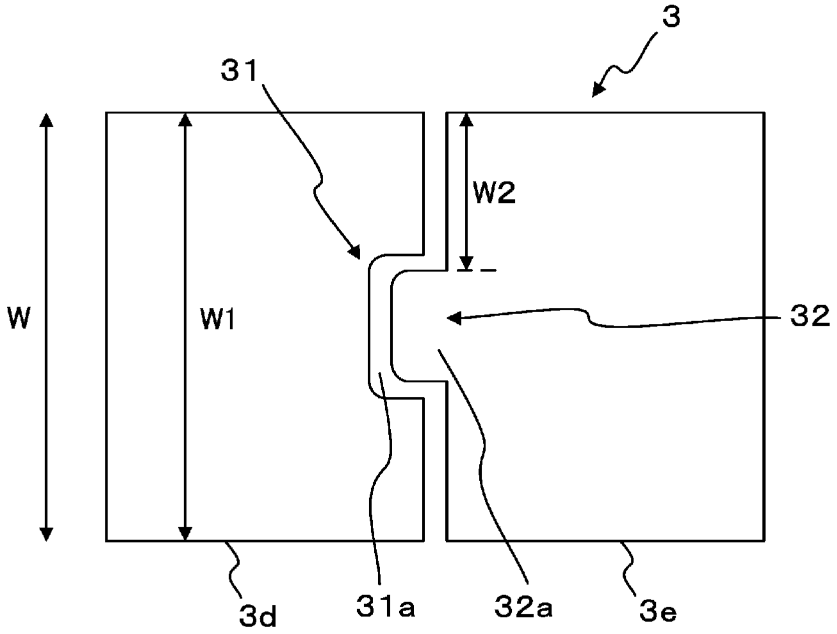
FIG. 6 is a diagram for describing the shapes of a first distal end portion of a first bottom surface portion and a second distal end portion of a second bottom surface portion.

FIG. 6 is a diagram for describing the shapes of the second distal end portion 32 of the second bottom surface portion 3*e* and the first distal end portion 31 of the first bottom surface portion 3*d*. As illustrated in FIG. 6, when a direction orthogonal to the direction in which the first bottom surface portion 3*d* and the second bottom surface portion 3*e* face each other is referred to as a width direction W, Expression (1) below can be satisfied for the relation between the width W1 of the first bottom surface portion 3*d* and a distance W2 from one end of the second bottom surface portion 3*e* to the projecting portion 32*a* (projection) in the width direction W.

$$W1/2>W2 \tag{1}$$

Figure 11:
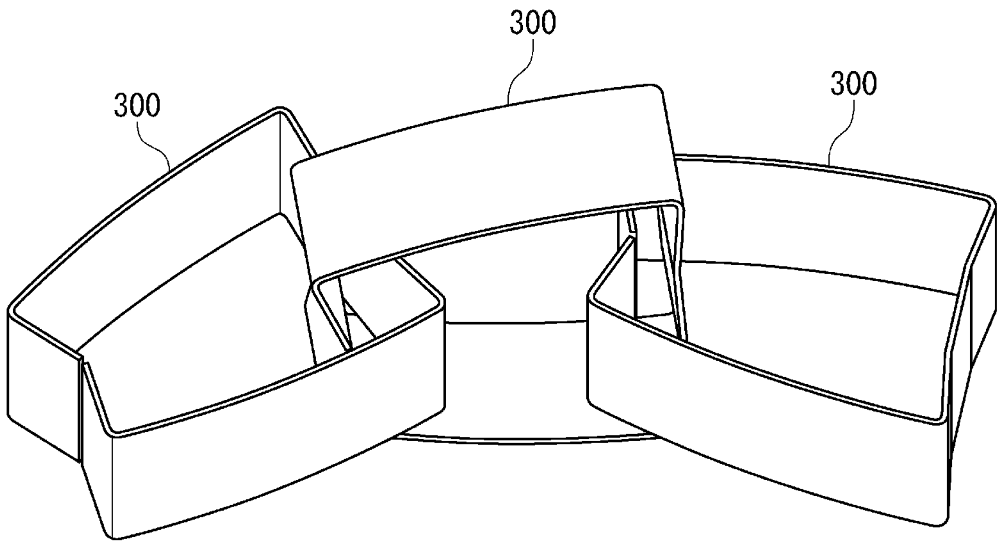
FIG. 11 is a diagram that illustrates a state where typical securing members are entangled with each other.

When the coil components 100 are manufactured, a large number of securing members 3 are kept in storage collectively. Thus, in the case of a typical securing member like the flat spring described in Japanese Unexamined Patent Application Publication No. 7-106157, a plurality of securing members 300 may become entangled with each other as illustrated in FIG. 11.

In the coil component 100 according to the present embodiment, however, the second distal end portion 32 of the second bottom surface portion 3*e* of the securing member 3 has the projecting portion 32*a* (projection) while the first distal end portion 31 of the first bottom surface portion 3*d* has the depressed portion 31*a* (depression), and in the state where the securing member 3 is removed from the magnetic core 1, the projecting portion 32*a* of the second distal end portion 32 (projection) is positioned inside the depressed portion 31*a* of the first distal end portion 31 (depression). Accordingly, entrance of another securing member 3 from the gap between the first distal end portion 31 of the first bottom surface portion 3*d* and the second distal end portion 32 of the second bottom surface portion 3*e* can be inhibited and as a result, entanglement of the securing members 3 can be inhibited.

Even if another securing member 3 enters the gap between the first bottom surface portion 3*d* and the second bottom surface portion 3*e*, the securing member 3 entering hits the projection as the projecting portion 32*a* of the second bottom surface portion 3*e* and further entrance can be hindered. In addition, since Expression (1) is satisfied for the relation between the width W1 of the first bottom surface portion 3*d* and the distance W2 from one end of the second bottom surface portion 3*e* to the projecting portion 32*a* (projection) in the width direction W, another securing member 3 that has entered the gap can escape out of the gap easily. That is, since the shape of the securing member 3 is predetermined so as to satisfy Expression (1), entanglement of the securing members 3 can be inhibited more effectively.

In the coil component 100 having the above-described structure, the magnetic core 1 where the first magnetic core 1*a* and the second magnetic core 1*b* are coupled forms a closed magnetic circuit. When normal mode current flows to the first coil conductor 2*a* and the second coil conductor 2*b*, magnetic flux in directions opposite each other occurs for the first coil conductor 2*a* and the second coil conductor 2*b* and the magnetic flux is canceled mutually and thus, a function as an inductor is not caused. On the other hand, when common mode current flows to the first coil conductor 2*a* and the second coil conductor 2*b*, magnetic flux in an identical direction occurs for the first coil conductor 2*a* and the second coil conductor 2*b* and a function as an inductor is caused.

That is, in the normal mode, signal components are transmitted without a function as an inductor, whereas in the common mode, noise components are transmitted with a function as an inductor. As described above, noise can be removed by separating a signal and noise using a difference in transmission mode.

Second Embodiment

A coil component 100 according to a second embodiment is different from the coil component 100 according to the first embodiment in the shape of the securing member.

Figure 7A:
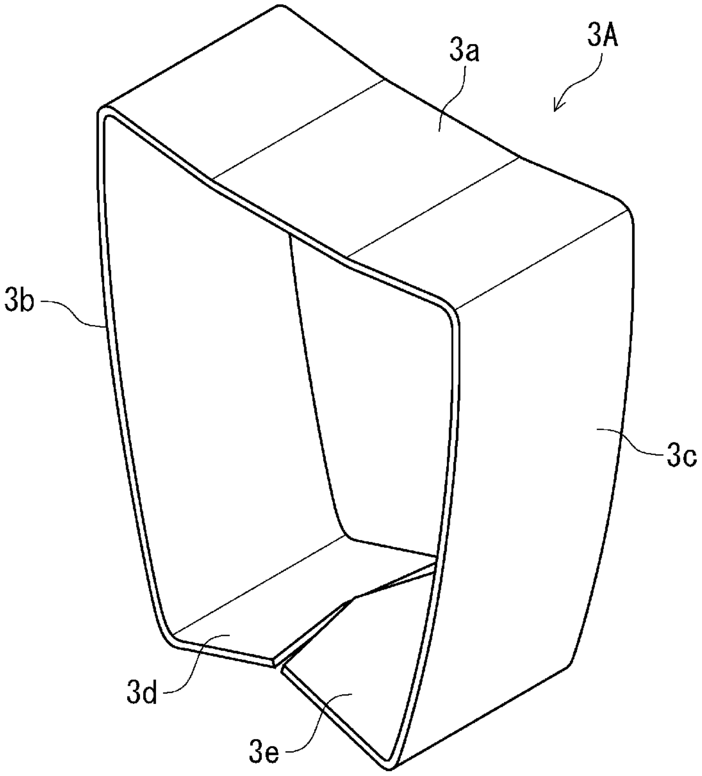
FIG. 7A is a perspective view that schematically illustrates the shape of a securing member of a coil component according to a second embodiment, which is viewed from diagonally above.
Figure 7B:
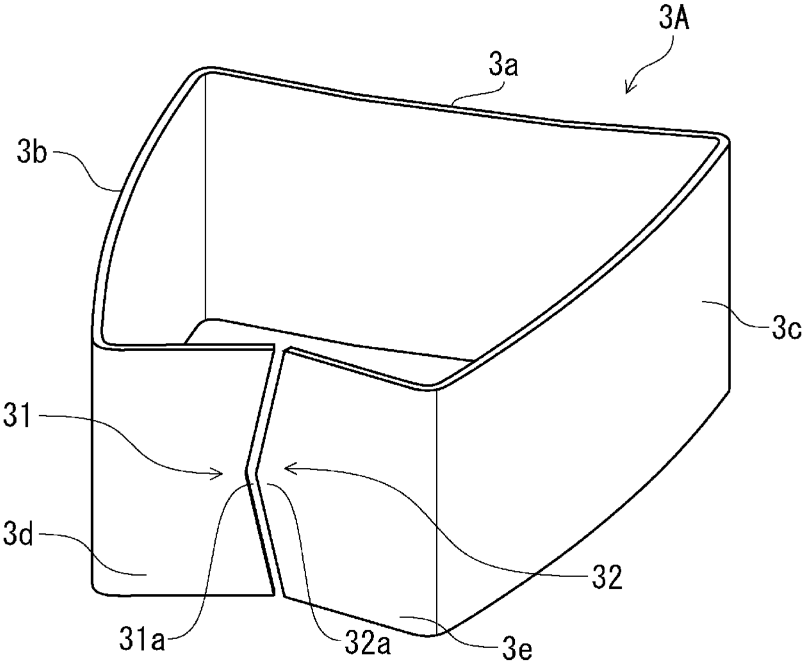
FIG. 7B is a perspective view that schematically illustrates the shape of the securing member, which is viewed from diagonally below.

FIG. 7A is a perspective view that schematically illustrates the shape of a securing member 3A of the coil component 100 according to the second embodiment, which is viewed from diagonally above, and FIG. 7B is a perspective view that schematically illustrates the shape of the securing member 3A, which is viewed from diagonally below.

Also in the coil component 100 according to the second embodiment, one distal end portion of the securing member 3A, which is one of a first distal end portion 31 of a first bottom surface portion 3*d* and a second distal end portion 32 of a second bottom surface portion 3*e*, has a projecting portion that projects toward the other distal end portion while the other distal end portion has a depressed portion, and in the state where the securing member 3A is removed from a magnetic core 1, the projecting portion is positioned inside the depressed portion. The description here is also predicated on that the second distal end portion 32 has a projecting portion 32*a* and the first distal end portion 31 has a depressed portion 31*a*. However, the first distal end portion 31 of the first bottom surface portion 3*d* may have the projecting portion while the second distal end portion 32 of the second bottom surface portion 3*e* may have the depressed portion.

In the present embodiment, as illustrated in FIGS. 7A and 7B, the projecting portion 32*a* of the second distal end portion 32 of the second bottom surface portion 3*e* has a shape that is tapered toward the first distal end portion 31 of the first bottom surface portion 3*d*. That is, the width of the second distal end portion 32 gradually decreases toward the first distal end portion 31.

As in the coil component 100 according to the first embodiment, also in the coil component 100 according to the second embodiment, entrance of another securing member 3A from the gap between the first distal end portion 31 of the first bottom surface portion 3*d* and the second distal end portion 32 of the second bottom surface portion 3*e* can be inhibited and thus, entanglement of the securing members 3A can be inhibited.

Further, the securing member 3A according to the second embodiment can be manufactured more easily than the securing member 3 according to the first embodiment since the securing member 3A does not have the projection or depression that is provided in the securing member 3 according to the first embodiment. That is, since a mold for punching out the securing member 3A with the aforementioned shape, which is used in the manufacture of the securing member 3A, has a simple structure, the manufacture of the mold can be facilitated and the manufacturing cost of the securing member 3A can be reduced.

It is the same as the coil component 100 according to the first embodiment that the first bottom surface portion 3*d* and the second bottom surface portion 3*e* of the securing member 3A serve as mounted portions when the coil component 100 is mounted over a mounting board.

Third Embodiment

A coil component 100 according to a third embodiment is different from the coil components 100 according to the first and second embodiments in the shape of the securing member.

Figure 8A:
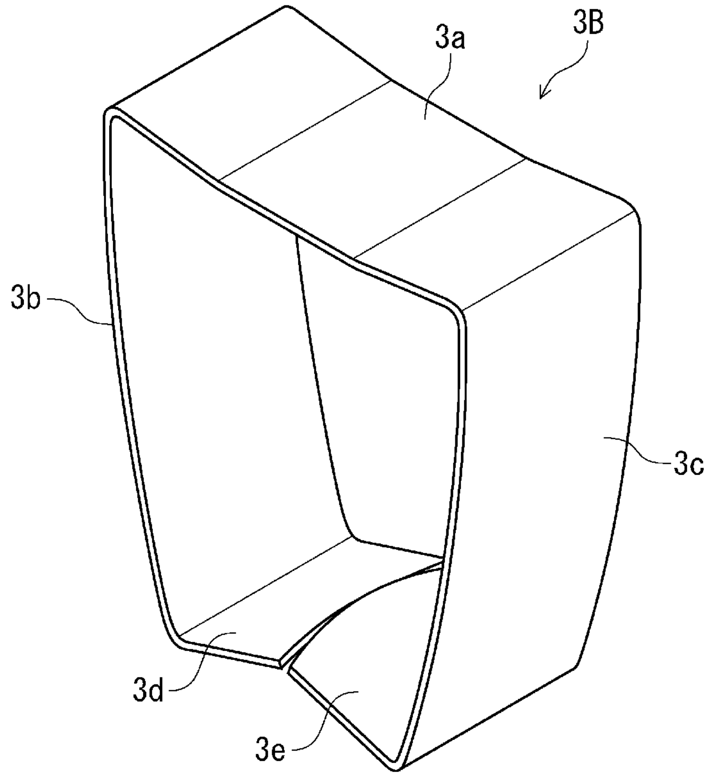
FIG. 8A is a perspective view that schematically illustrates the shape of a securing member of a coil component according to a third embodiment, which is viewed from diagonally above.
Figure 8B:
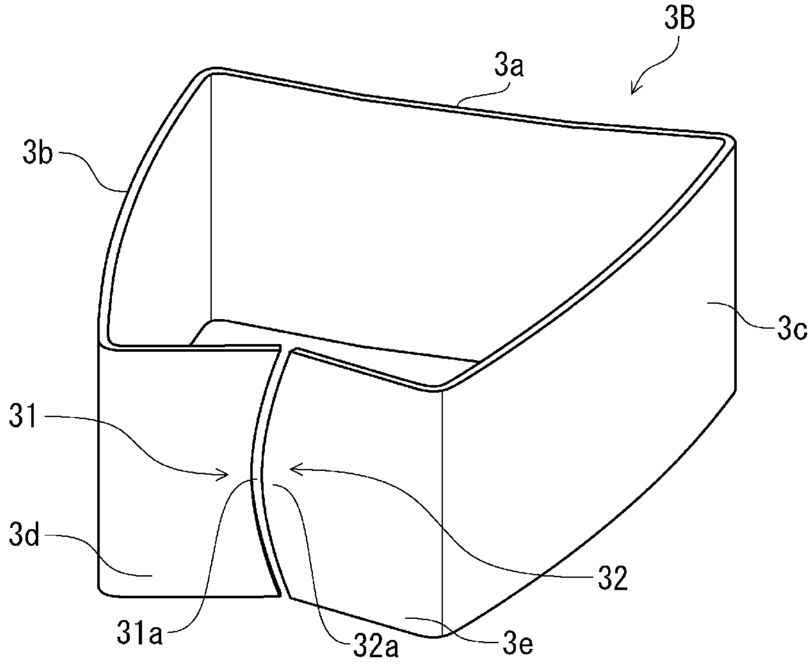
FIG. 8B is a perspective view that schematically illustrates the shape of the securing member, which is viewed from diagonally below.

FIG. 8A is a perspective view that schematically illustrates the shape of a securing member 3B of the coil component 100 according to the third embodiment, which is viewed from diagonally above, and FIG. 8B is a perspective view that schematically illustrates the shape of the securing member 3B, which is viewed from diagonally below.

Also in the coil component 100 according to the third embodiment, one distal end portion of the securing member 3B, which is one of a first distal end portion 31 of a first bottom surface portion 3*d* and a second distal end portion 32 of a second bottom surface portion 3*e*, has a projecting portion that projects toward the other distal end portion while the other distal end portion has a depressed portion, and in the state where the securing member 3B is removed from a magnetic core 1, the projecting portion is positioned inside the depressed portion. The description here is also predicated on that the second distal end portion 32 has a projecting portion 32*a* and the first distal end portion 31 has a depressed portion 31*a*. However, the first distal end portion 31 of the first bottom surface portion 3*d* may have the projecting portion while the second distal end portion 32 of the second bottom surface portion 3*e* may have the depressed portion.

In the present embodiment, a distal end portion of the projecting portion 32*a* of the second distal end portion 32 has an arc shape as illustrated in FIGS. 8A and 8B. The arc shape also includes an arc of an ellipse in addition to an arc of a perfect circle.

As in the coil component 100 according to the first embodiment, also in the coil component 100 according to the third embodiment, entrance of another securing member 3B from the gap between the first distal end portion 31 of the first bottom surface portion 3*d* and the second distal end portion 32 of the second bottom surface portion 3*e* can be inhibited and thus, entanglement of the securing members 3B can be inhibited.

Further, the securing member 3B according to the third embodiment can be manufactured more easily than the securing member 3 according to the first embodiment since the securing member 3B does not have the projection or depression that is provided in the securing member 3 according to the first embodiment. That is, since a mold for punching out the securing member 3B with the aforementioned shape, which is used in the manufacture of the securing member 3B, has a simple structure, the manufacture of the mold can be facilitated and the manufacturing cost of the securing member 3B can be reduced.

It is the same as the coil components 100 according to the first and second embodiments that the first bottom surface portion 3*d* and the second bottom surface portion 3*e* of the securing member 3B serve as mounted portions when the coil component 100 is mounted over a mounting board.

Fourth Embodiment

Figure 9:
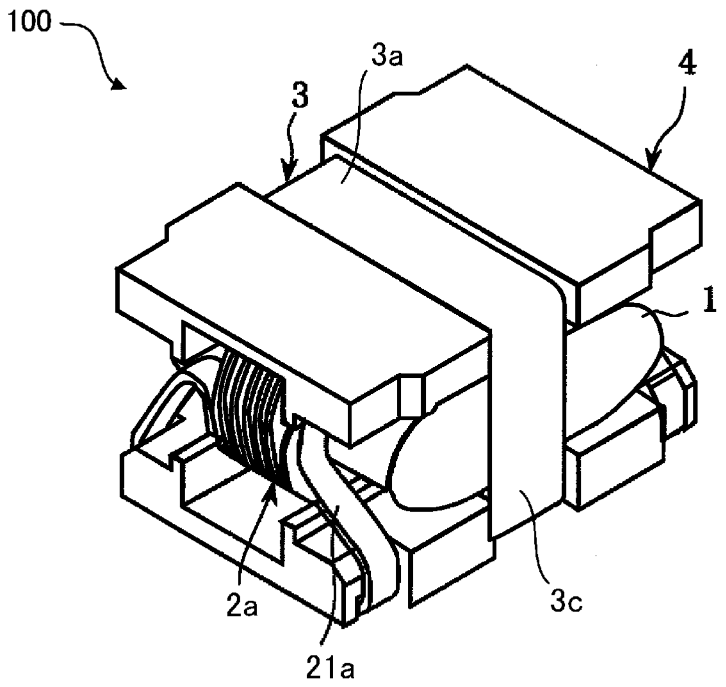
FIG. 9 is a perspective view that schematically illustrates the shape of a coil component according to a fourth embodiment, which is viewed from diagonally above.

FIG. 9 is a perspective view that schematically illustrates the shape of a coil component 100 according to a fourth embodiment, which is viewed from diagonally above. The coil component 100 according to the fourth embodiment is different from the coil component 100 according to the first embodiment in the orientations of the pair of coil conductors. That is, in the coil component 100 according to the fourth embodiment, the axial direction of each winding shaft of a pair of coil conductors 2*a* and 2*b* is in the direction orthogonal to a first side surface portion 3*b* and a second side surface portion 3*c* of a securing member 3.

In the coil component 100 according to the fourth embodiment, the securing member 3A illustrated in FIGS. 7A and 7B may be used or the securing member 3B illustrated in FIGS. 8A and 8B may be used instead of the securing member 3.

Figure 10:
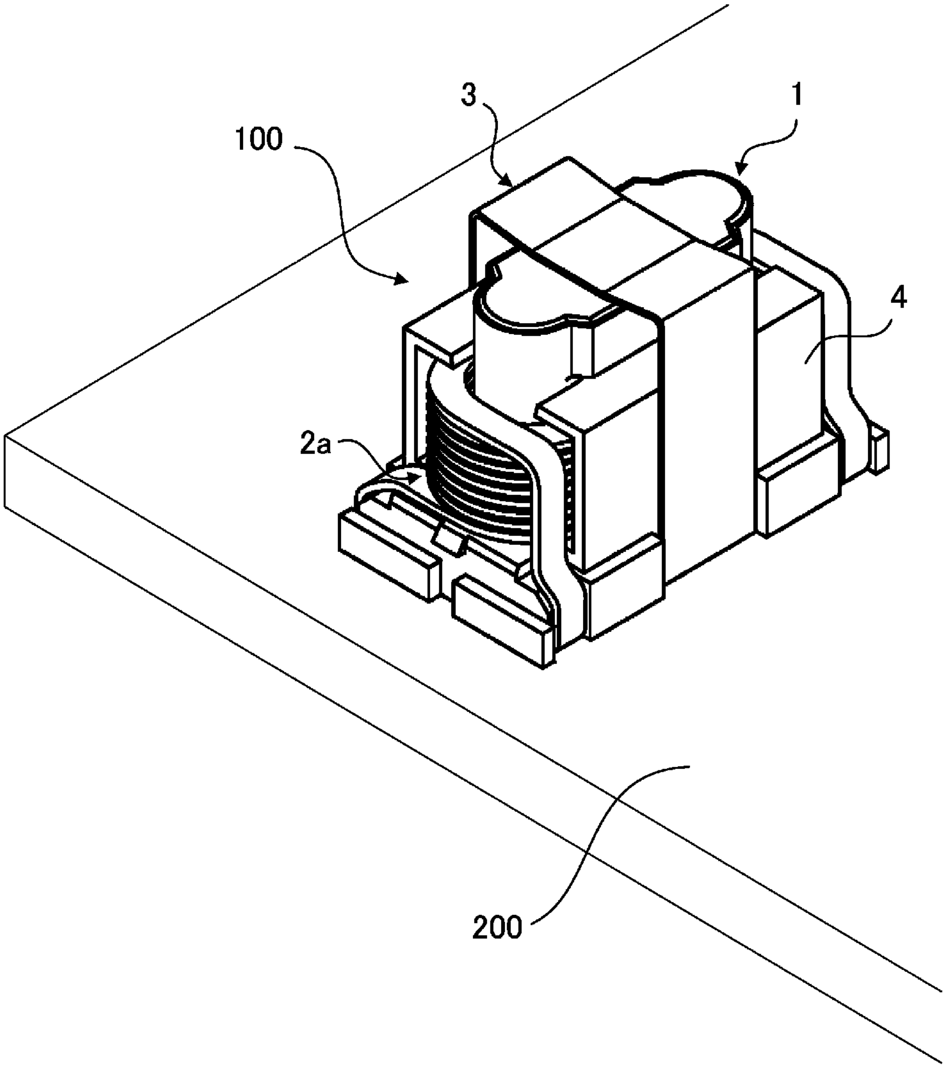
FIG. 10 is a perspective view that illustrates a state where the coil component is mounted over a mounting board.

The coil components 100 according to the above-described first to fourth embodiments are each mounted over a mounting board and used. As described above, when the coil component 100 is mounted over the mounting board, the first bottom surface portion 3*d* and the second bottom surface portion 3*e* of the securing member 3 are joined using solder or the like to wiring, electrodes, or the like on the mounting board. FIG. 10 is a perspective view that illustrates a state where the coil component 100 is mounted over a mounting board 200. In the example presented in FIG. 10, the first bottom surface portion 3*d* and the second bottom surface portion 3*e* are mounted over the mounting board 200 with solder interposed therebetween. The mounting board 200 where the coil component 100 is mounted is installed in, for example, an electronic component. In that case, at least the mounting board 200 and the coil component 100 mounted over the mounting board 200 are provided in the electronic component.

The present disclosure is not limited to the above-described embodiments but may allow various applications and variations to be added thereto within the scope of the present disclosure. For example, the securing members 3, 3A, and 3B are described as being made from metal but may be made from, for example, an insulating material, such as plastic, and the first bottom surface portion 3*d* and the second bottom surface portion 3*e* that serve as mounted portions may be made from metal.

In the above-described embodiments, when the securing members 3, 3A, and 3B are each viewed in positions where the first side surface portion 3*b* and the second side surface portion 3*c* face each other on the left and right sides in the state of being removed from the magnetic core 1, the depressed portion 31*a* has a shape dependent on the shape of the projecting portion 32*a*. However, in the state where the securing members 3, 3A, and 3B are each removed from the magnetic core 1, the projecting portion 32*a* is just needed to be structured so as to be positioned inside the depressed portion 31*a* and the shape of the depressed portion 31*a* is not necessarily needed to be a shape dependent on the shape of the projecting portion 32*a*. Further, the number of projecting portions 32*a* and depressed portions 31*a* are each not limited to one but may be two or more. The first distal end portion 31 and the second distal end portion 32 may be structured without having the projecting portion 32*a* or the depressed portion 31*a*.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:
a magnetic core that includes a pair of wind portions;
a pair of coil conductors where respective conductive wires are wound around the pair of wind portions; and
a securing member that has spring properties, includes an upper surface portion, a first side surface portion and a second side surface portion, and a first bottom surface portion and a second bottom surface portion, and is configured to secure the magnetic core while surrounding the magnetic core, such that the first bottom surface portion and the second bottom surface portion are configured as mounted portions when the coil component is mounted over a mounting board,
wherein in a state where the securing member is removed from the magnetic core,
an angle formed by the upper surface portion and the first side surface portion and an angle formed by the upper surface portion and the second side surface portion are each an acute angle,
an angle formed by the first side surface portion and the first bottom surface portion and an angle formed by the second side surface portion and the second bottom surface portion are each an acute angle, and
the first side surface portion and the second side surface portion each has a curved surface.

2. The coil component according to claim 1, wherein
one distal end portion of the securing member has a projecting portion that projects toward the other distal end portion thereof, and the other distal end portion of the securing member has a depressed portion, the one distal end portion being one of a first distal end portion of the first bottom surface portion and a second distal end portion of the second bottom surface portion, and
in a state where the securing member is removed from the magnetic core, the projecting portion is positioned inside the depressed portion.

3. The coil component according to claim 2, wherein
the projecting portion is a projection where part of the one distal end portion projects toward the other distal end portion, and the depressed portion is a depression.

4. The coil component according to claim 2, wherein
the projecting portion has a shape that is tapered toward the other distal end portion.

5. The coil component according to claim 2, wherein
a distal end portion of the projecting portion has an arc shape.

6. The coil component according to claim 2, further comprising:
a holding member configured to hold the magnetic core and the pair of coil conductors while surrounding the magnetic core and the pair of coil conductors, wherein
the securing member secures the magnetic core and the holding member while surrounding the magnetic core and the holding member.

7. The coil component according to claim 2,
wherein a plating film is provided on a portion of the first bottom surface portion and the second bottom surface portion, the portion thereof being mounted over the mounting board.

8. An electronic component comprising:
a mounting board; and
the coil component according to claim 2, mounted over the mounting board,
wherein the first bottom surface portion and the second bottom surface portion are mounted over the mounting board with solder interposed therebetween.

9. The coil component according to claim 3, further comprising:
a holding member configured to hold the magnetic core and the pair of coil conductors while surrounding the magnetic core and the pair of coil conductors, wherein
the securing member secures the magnetic core and the holding member while surrounding the magnetic core and the holding member.

10. The coil component according to claim 3,
wherein a plating film is provided on a portion of the first bottom surface portion and the second bottom surface portion, the portion thereof being mounted over the mounting board.

11. The coil component according to claim 1, further comprising:
a holding member configured to hold the magnetic core and the pair of coil conductors while surrounding the magnetic core and the pair of coil conductors, wherein
the securing member secures the magnetic core and the holding member while surrounding the magnetic core and the holding member.

12. The coil component according to claim 1,
wherein a plating film is provided on a portion of the first bottom surface portion and the second bottom surface portion, the portion thereof being mounted over the mounting board.

13. An electronic component comprising:
a mounting board; and
the coil component according to claim 1, mounted over the mounting board,
wherein the first bottom surface portion and the second bottom surface portion are mounted over the mounting board with solder interposed therebetween.

14. A coil component comprising:

a magnetic core that includes a pair of wind portions;

a pair of coil conductors where respective conductive wires are wound around the pair of wind portions; and a securing member that has spring properties, includes an upper surface portion, a first side surface portion and a second side surface portion, and a first bottom surface portion and a second bottom surface portion, and is configured to secure the magnetic core while surrounding the magnetic core, such that the first bottom surface portion and the second bottom surface portion are configured as mounted portions when the coil component is mounted over a mounting board, wherein one distal end portion of the securing member has a projecting portion that projects toward the other distal end portion, and an other distal end portion of the securing member has a depressed portion, the one distal end portion being one of a first distal end portion of the first bottom surface portion and a second distal end portion of the second bottom surface portion, and the projecting portion and the depressed portion are arranged side by side along a direction in which the first side surface portion and the side surface portion face each other.

15. The coil component according to claim 14, wherein the projecting portion is a projection where part of the one distal end portion projects toward the other distal end portion, and the depressed portion is a depression.

16. The coil component according to claim 14, wherein the projecting portion has a shape that is tapered toward the other distal end portion.

17. The coil component according to claim 14, wherein a distal end portion of the projecting portion has an arc shape.

18. The coil component according to claim 14, further comprising:

a holding member configured to hold the magnetic core and the pair of coil conductors while surrounding the magnetic core and the pair of coil conductors, wherein the securing member secures the magnetic core and the holding member while surrounding the magnetic core and the holding member.

19. The coil component according to claim 14, wherein a plating film is provided on a portion of the first bottom surface portion and the second bottom surface portion, the portion thereof being mounted over the mounting board.

20. An electronic component comprising:

a mounting board; and the coil component according to claim 14, mounted over the mounting board, wherein the first bottom surface portion and the second bottom surface portion are mounted over the mounting board with solder interposed therebetween.

* * * * *